Dec. 20, 1966   R. G. BRUGGER   3,292,269
GYROSCOPIC COMPASSES
Filed June 27, 1963   3 Sheets-Sheet 3

INVENTOR.
RICHARD G. BRUGGER
BY Arthur H. Serrell
ATTORNEY 3,292,269
GYROSCOPIC COMPASSES
Richard G. Brugger, Hempstead, N.Y., assignor to Sperry
Rand Corporation, Great Neck, N.Y.
Filed June 27, 1963, Ser. No. 291,132
14 Claims. (Cl. 33—226)

This invention relates to miniature gyroscopic compasses having particular utility on land craft or vessels that under start-up conditions require that the directive member be quickly oriented and levelled. In the improved compass, a pendulous yoke is mounted on the follow-up ring and the directive member is mounted with freedom about a normally vertical axis on a gimbal that is mounted on the yoke with freedom about a normally horizontal East-West axis.

An object of the present invention is to orient the directive member of the compass with the gyroscopic rotor of the member spinning and with the member and gimbal caged with respect to the pendulous yoke rather than to the hull or chassis of the craft or vessel on which the binnacle of the device is fixedly mounted.

Another object of the invention is to level the directive member by a torque about its axis when freed from a caged condition relative to the yoke that is dependent on the tilt of the gimbal about its normally horizontal East-West axis.

One of the features of the invention resides in the inclusion in the compass structure of a means for providing an operating input to the servomotor connected to move the follow-up ring and effect orientation of the caged directive member under start-up conditions.

Another feature of the invention is provided by the included means for caging the directive member and gimbal to the pendulous yoke of the compass.

A further feature of the invention resides in inclusion in the compass structure of normally angularly displaced spring and stop parts on the member and gimbal arranged in engageable relation to provide a levelling torque about the axis of the member.

Still a further feature of the invention is provided by the means for displacing the levelling torque exerting parts to an engaged condition that includes the servomotor of the compass.

Another feature of the invention resides in the inclusion in the compass structure of a levelling means where the operation of the included servomotor is dependent on the output of a gravity reference that detects tilt of the gimbal about its East-West axis.

Figure 1:
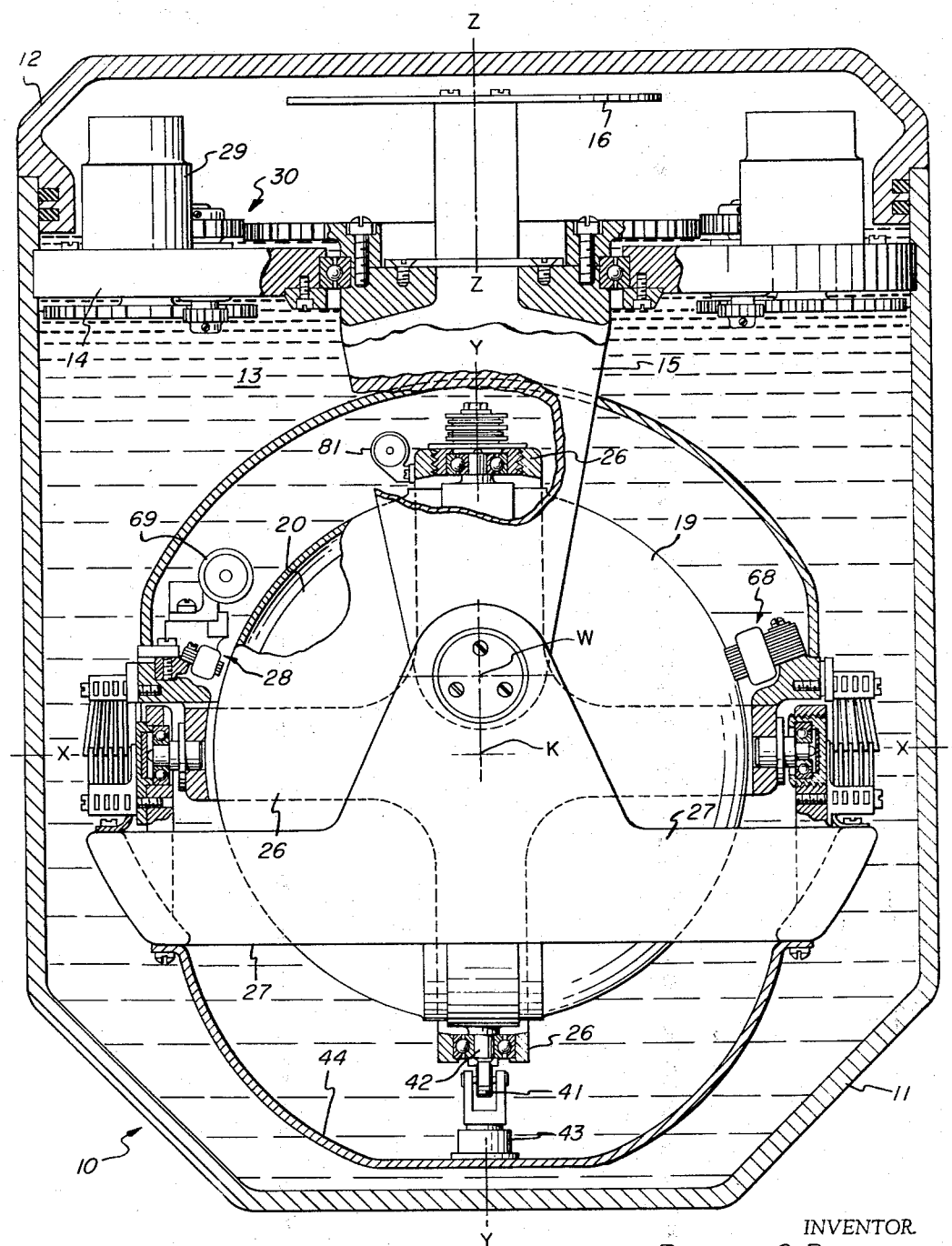
Figure 2:
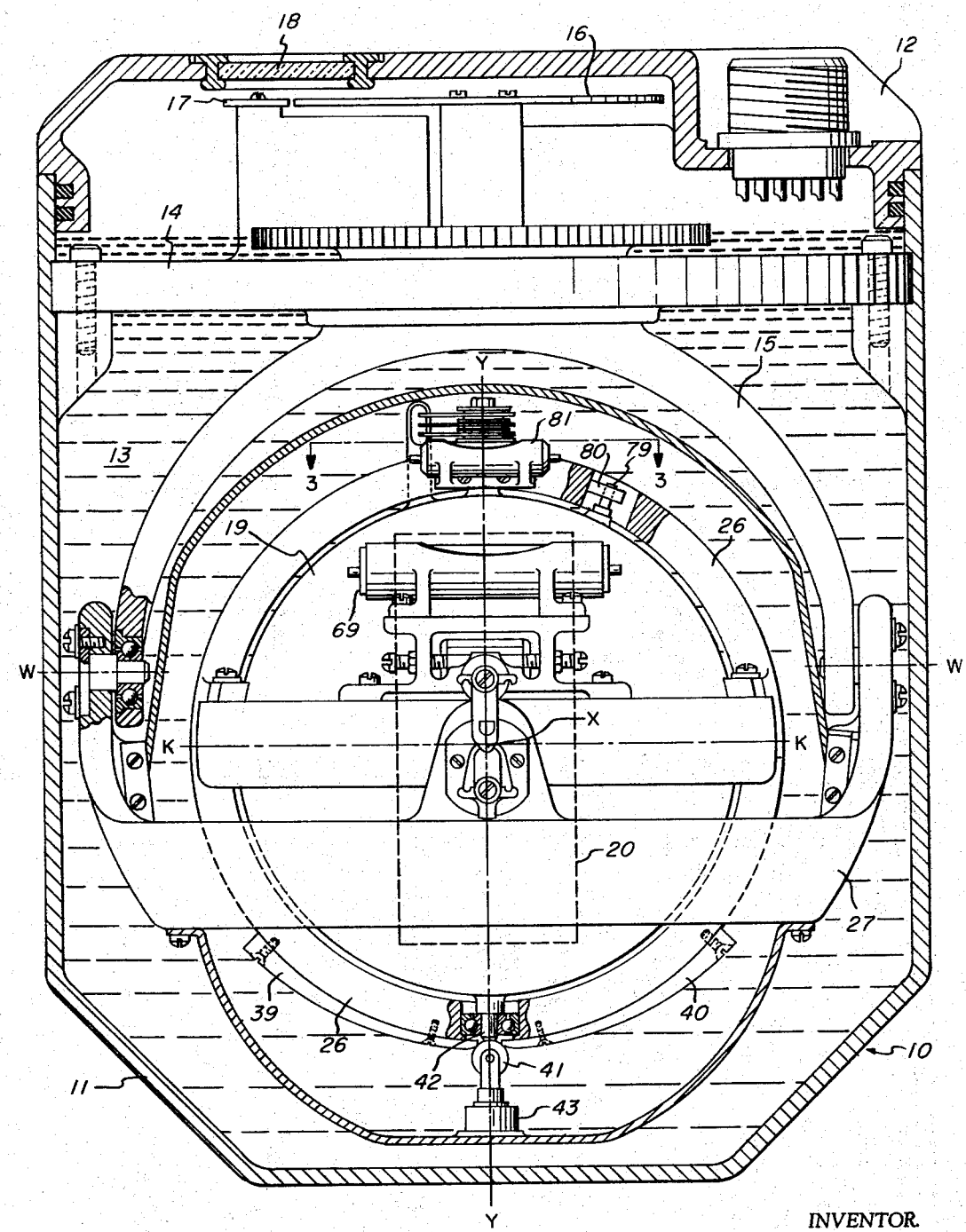
Figure 3:
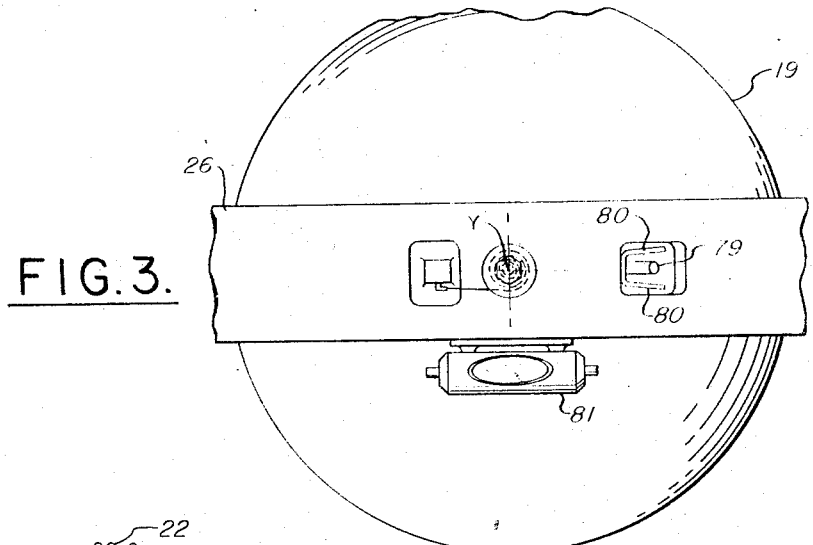
Figure 4:
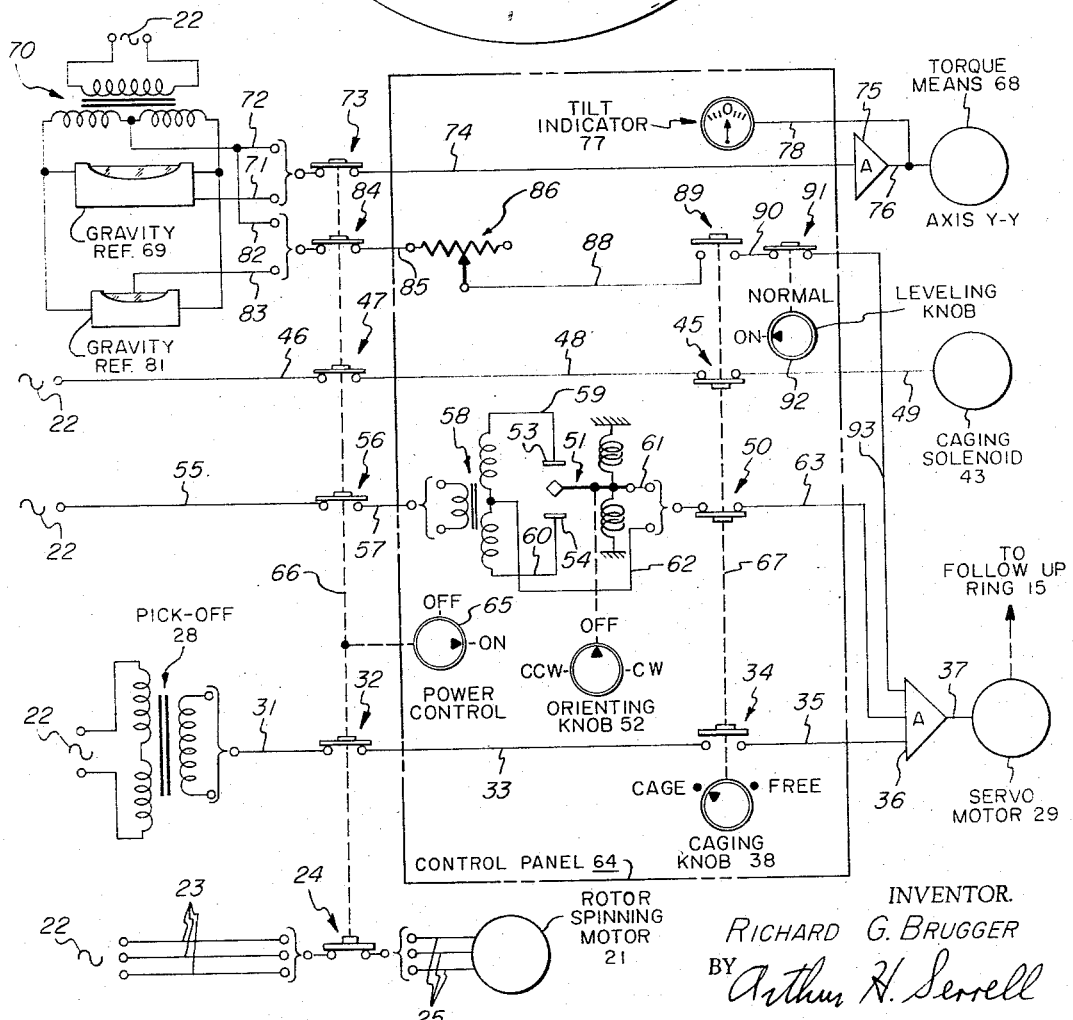

Other objects, features and structural details of the invention will be apparent from the following description with relation to the accompanying drawings in which:

FIG. 1 is an elevational view of a gyroscopic compass structure embodying the present invention looking in a Northerly direction along the normally horizontal North-South spin axis of the rotor of the directive member, FIG. 2 is a view similar to FIG. 1 taken in a vertical plane that includes the axis of the rotor of the compass, FIG. 3 is a sectional view taken on line 3—3 in FIG. 2, and FIG. 4 is a schematic view and circuit diagram showing the orient and level control panel and the connections between the components of the improved gyroscopic compass.

In the compass as shown in FIGS. 1 and 2, the binnacle 10 includes connected fluid container and cover parts respectively indicated at 11 and 12. The fluid fills the binnacle to the level indicated at 13 so that the operating components of the device are immersed in the fluid. As shown, the binnacle 10 includes an internal frame or plate 14 fixed to the container 11 on which a follow-up ring 15 is carried by suitable bearings to move about a vertical axis Z—Z. The compass card of the device indicated at 16 is fixedly connected to an upwardly extending portion of the ring 15 above the level 13 of the fluid. The card 16 is readable on a lubber line 17 fixed to the frame 14 of the binnacle through a window 18 in the cover 12. Binnacle 10 is accordingly fixedly mounted on the vessel or craft on which the device is used to provide a directional or heading indication where the card 16 and line 17 are visible through the window 18 to a human operator. The location of the binnacle 10 may be on the instrument board of the vessel or craft in front of the operator.

The directive member of the improved gyroscopic compass is indicated as a hollow sphere 19 having a gyroscopic rotor 20 therein spinning about a normally horizontal axis K—K in a North-South direction, FIG. 2. The means provided to drive the rotor 20 as shown in FIG. 4 is a suitable electric motor 21 that is energized from an A.C. source 22 by way of leads 23, make-break switching means 24 shown in closed circuit condition and leads 25.

In the improved gyroscopic compass, the member or sphere 19 is connected to the frame 14 of binnacle 10 through a system of gimbals that includes gimbal 26 on which the member 19 is mounted with freedom about a normally vertical axis Y—Y. As shown in FIGS. 1 and 2, the system further includes a pendulous yoke 27 on which the gimbal 26 is mounted with freedom about a normally horizontal, East-West directed, axis X—X. Yoke 27 in turn is mounted on the follow-up ring 15 of the system with freedom about a second normally horizontal axis W—W that is perpendicular to the gimbal axis X—X. In an oriented relation of the ring 15 and member 19, the axis W—W of the pendulous yoke 27 and the spinning axis K—K of the rotor 20 of the member 19 are in alignment in a vertical plane as shown in FIG. 2. The gimbal system described mounts the directive member 19 on the frame 14 of the binnacle 10 pendulously conditioned in relation to the North-South axis K—K and in neutral equilibrium in relation to the East-West gimbal axis X—X. The pendulous condition is provided by the yoke 27 and gimbal 26 in locating the center of gravity of the compass at the intersection of axes Y—Y, X—X and K—K below that of the yoke axis W—W. The neutral equilibrium condition is provided by constructionally locating the center of gravity of the compass on the East-West gimbal axis X—X. The immersed components of the compass are constructed of such volume and material as to substantially correspond in density to the density of the displaced fluid at the operating temperature of the device. Accordingly, the movable components of the compass are buoyantly supported by the fluid in a manner relieving the weight loading on the respective bearings between the frame 14 and member 19.

In the claims herebelow, the "gimbal axis" and the "member axis" refer in both cases to the mounting axis of the named element.

The compass includes a conventional follow-up means for slaving the ring 15 to the directive member 19 to position the card 16 in accordance with the North-South directed member 19. As the lubber line 17 readable on the card 16 is fixed to the binnacle frame 14 and the binnacle 10 moves with the craft or vessel as it changes heading, the line 17 moves with respect to the card to provide the directional indication of the device. As shown in FIGS. 1 and 4, the follow-up means provided includes an electro-magnetic pick-off 28 of the E-type having a wound stator part fixed to the gimbal 26 and an armature part fixed to the member 19. Pick-off 28 produces an electrical output that is dependent in amplitude and phase on the magnitude and sense of the departure of the gimbal 26 and member 19 from an oriented condition. The means further includes a circuit connecting the member 19 to the ring 15 in follow-up relation in which the output of the pick-off 28 is fed to a servomotor that is connected to move the ring 15 through suitable reduction gearing 30. As shown in FIG. 4, the pick-off 28 is energized from the A.C. source 22. The circuit connecting the pick-off 28 to the servomotor 29 includes leads 31, make-break switching means 32 shown in closed circuit condition, leads 33, make-break switching means 34 shown in open circuit condition, leads 35, amplifier 36 and leads 37. In the operational condition of the parts shown in FIG. 4, the human operator has set a caking knob 38 to render the caging means included in the compass effective. This is required to effect orientation of the card and member 19 under start-up conditions of the compass. In normal operation of the compass, the knob 38 is set in the free position with the caging means rendered ineffective. In the provided arrangement switching means 34 constitutes a normally ineffective means for opening the follow-up circuit. In the normal operation of the follow-up means, the servomotor 29 moves the ring in accordance with the output of the pick-off 28 to maintain the orientation between the ring 15 and directive member 19.

In accordance with the present invention, the means for orienting and levelling the rotor member 19 of the improved gyroscopic compass includes normally ineffective means for caging the directive member 19 and gimbal 26 to the yoke 27. The caging means shown in operative condition in FIGS. 1 and 2 provided in the improved gyroscopic compass include two cam pieces 39 and 40 fixedly mounted on the gimbal 26 and a cooperating roller 41 that is adapted to engage the surfaces of the cams as well as the end surface of the lower trunnion 42 extending from the directive member 19. In operative caging position, the roller 41 sits between the adjacent ends of the cams 39 and 40 to lock the gimbal 26 to the yoke 27 with respect to the axis X—X and the roller 41 frictionally engages the end of the trunnion of the member 19 to lock it to the yoke 27 with respect to the axis Y—Y. In the orienting operation, the caged member 19 is locked to the pendulous yoke 27 rather than to the hull or chassis of the craft or vessel on which the binnacle of the device is fixedly mounted.

The means provided for rendering the caging means effective includes a circuit that energizes a caging solenoid 43 whose stator is fixedly mounted on a fluid shield 44 fixed to the yoke 27. The armature of the solenoid 43 extends vertically and includes a bifurcated end on which the roller 41 is located. As shown in FIG. 4, the caging circuit includes a make-break switching means 45 which is shown in closed circuit condition when switching means 34 is open by the setting of the knob 38. The caging circuit shown in FIG. 4 energizes the solenoid 43 from the source 22 by way of lead 46, make-break switching means 47 shown in closed circuit condition, lead 48, switching means 45 and lead 49. The described caging means is restored to its normally ineffective condition when knob 38 is set by the human operator in the free position. This opens the caging circuit at switching means 45 to de-energize the solenoid 43 and permit the armature to move downwardly due to the force of a return spring. This disengages the roller 41 from both the trunnion 42 and the caging means 39 and 40.

In the orienting operation of the improved gyroscopic compass, the servomotor 29 is used to move the caged member 19, gimbal 26 and yoke 27 with the follow-up ring 15 and card 16 about the axis Z—Z. Here, the means for providing an orienting input to the servomotor 29 includes a circuit connecting amplifier 36 to the source 22 with a normally open make-break switching means 50 that in FIG. 4 is shown in closed circuit condition. The orienting circuit further includes a reversing switch 51 with a spring centered blade or manually operable part movable by an orienting knob 52 between contacts or positions 53, 54 that alternately effect clockwise or counterclockwise movement of the ring 15 and caged member 19 to an oriented condition. As shown in FIG. 4, this circuit includes lead 55 to source 22, make-break switching means 56 shown in closed circuit condition and lead 57 to the primary of a transformer 58. The contacts 53, 54 of switch 51 are respectively connected to the ends of the secondary of the transformer 58 by way of leads 59 and 60. Leads 61 and 62 respectively from the blade of switch 51 and from a center tap location on the secondary of the transformer 58 are connected to the amplifier 36 by way of the switching means 50 and leads 63.

In the improved compass, the caging knob 38 and knob 52 are external components of an orient and level control panel indicated at 64 in FIG. 4. The panel 64 is preferably arranged on the craft or vessel in a position where its knobs may be manipulated by the human operator as the card 16 and lubber line 17 are observed. Accordingly, the panel 64 may be provided as a part of the binnacle 10 or may be located on the instrument board of the vessel or craft on which the compass is used. Panel 64 also includes an off-on power control knob 65 which is connected by shafting 66 to the blades of the respective switching means 24, 32, 56 and 47 which are shown in closed circuit condition corresponding to the setting of the knob.

As shown in FIG. 4, knob 38 operates the blades of the switching means 34, 50 and 45 through shafting 67 to provide a means for conditioning the switching means 45, 50 and 34 to close the caging and orienting circuits and open the follow-up circuit simultaneously. At start-up, the operator turns the knob 38 to the cage position shown in FIG. 4. This closes the caging circuit to solenoid 43 by way of switching means 47 and switching means 45 to render the caging means effective by energization of the solenoid 43 and the resulting movement of the roller 41 into a position between the cams 39 and 40 on the gimbal 26 where it also engages the end of the trunnion 42 of the directive member 19. With the directive member and gimbal 26 caged to the pendulous yoke 27, and the switching means 34 of the follow-up circuit open, the operator then closes the orienting circuit to the servomotor 29 through the reversing switch 51 by holding its blade in engagement with one of the contacts 53, 54 against the action of the spring centering means. By this means this ring 15, yoke 27, caged gimbal 26 and member 19 are moved together either in a clockwise or counterclockwise direction about axis Z—Z and axis Y—Y depending on the position of knob 52 so that the card 16 connected to the ring 15 moves with respect to the lubber line 17 to the orientation in azimuth that the craft or vessel is known to have.

When the components are correctly oriented with respect to the binnacle 10, the caging circuit is returned to its normally ineffective condition by turning knob 38 to the FREE position to open the switching means 50 of the caging circuit. In FIGS. 1, 2 and 4 of the drawings, the components are represented in caged condition with the knob 38 set accordingly and the follow-up circuit opened by the switching means 34. With the turning of the knob 38 to the FREE position and knob 92 turned to close switch 91 the follow-up circuit from pick-off 28 to amplifier 36 is closed at switching means 34 and the levelling means, which comprises gravity reference 81, included in the improved compass, is rendered effective. At the completion of the orienting operation, the operator releases the knob 52 to open the orienting circuit at the switch 51.

The operation of the means for levelling the member 19 about axis X—X is effective upon restoration of the described switch condition means to normal condition after the completion of the orienting operation. Knob 38 is turned to the FREE position and knob 92 is turned to the NORMAL position. With the oriented components freed from the pendulous yoke 27, levelling of the member 19 about axis X—X is automatically accomplished by torques exerted about the axis Y—Y that are dependent on the tilt of the member about the axis X—X of the gimbal 26.

In the improved compass, one of the means for exerting the torque about axis Y—Y is provided by a levelling circuit in which a torquing means 68 is operated by the output of a gravity reference 69. As shown in FIG. 1, the stator part of means 68 is fixedly mounted on the gimbal 26 and the armature part is fixed to the member 19. Reference 69 is shown as an electrolytic level that is energized from source 22 and fixed to the gimbal 26 to provide an electrical output depending on the tilt of the member 19 about the axis X—X of the gimbal. In the circuit shown in FIG. 4 connecting reference device 69 to means 68, energy from the source 22 is supplied to opposite terminals of the level by way of transformer 70. A lead 71 to the common terminal of the level 69 and a lead 72 to a center tap position on the secondary of the transformer 70 carry the output of the level to torquing means 68 by way of make-break switching means 73 shown in closed circuit condition under control of the knob 65 and shafting 66, lead 74, amplifier 75 and lead 76. A tilt indicator 77 of the null type is connected by lead 78 to lead 76 to indicate to the human operator when the levelling operation is completed. As shown, the indicator 77 is included on the panel 64. Here, the torque exerted by means 68 is dependent on the output of the level 69. As the directive member 19 levels, the gimbal 26 becomes free of tilt about axis X—X and the output of the gravity reference or electrolytic level 69 nulls along with the pointer of the indicator 77.

As shown in FIGS. 1, 3 and 4, the primary levelling torque in the improved gyroscopic compass is provided by normally angular displaced spring and stop parts on the respective gimbal and member components arranged in engageable relation to exert a torque about the Y—Y axis. In the arrangement shown, a stop 79 fixed to member 19 extends to a position between spaced springs 80 that are suitably fixed at one of the ends thereof to the gimbal 26. To displace the components sufficiently for the stop 79 to engage one of the springs 80 in a torque exerting condition, the compass includes a circuit for providing a biasing input to the amplifier 36 of the follow-up circuit. As shown in FIGS. 1 and 4, the biasing circuit includes a second gravity reference 81 that is also energized from source 22. The reference 81 is an electrolytic level that is fixedly mounted on gimbal 26 to detect tilt about axis X—X and provide an output that is dependent on the tilt angle. In the circuit shown in FIG. 4, the spaced terminals of the reference 81 are connected to the respective ends of the secondary of the transformer 70. The output of the level 81 is fed to the amplifier 36 of the servomotor 29 by way of lead 82 connected to lead 72, a lead 83 to the common terminal of the level 81, a make-break switching means 84 shown in closed circuit condition, lead 85 to a potentiometer 86 whose adjustable slider regulates the magnitude of the bias output signal of the circuit, lead 88 to the slider of the potentiometer 86, switching means 89 shown in open circuit condition, lead 90, switching means 91 set by the operator by positioning a levelling knob 92 on the panel 64, and lead 93. The biasing input to the amplifier 36 of the follow-up circuit maintains an offset between the member 19 and the gimbal 26 to engage the stop 79 and one of the springs 80. The blades of the switching means 73 and 84 are connected to the shafting 66 from the off-on knob 65. The blades of the switching means 89 are connected to shafting 67 from the caging knob 38, the circuit closing as does the follow-up circuit with switching means 34 therein when the knob 38 is moved to the free position by the human operator at the completion of the orienting operation. For initial levelling, the human operator sets knob 92 to the position closing switch 91 so that the biasing input circuit to the servomotor 29 is effective to carry out the primary levelling operation when the caging knob 38 is moved to the free position. Tilt of the directive member 19 is corrected through the operation of the engaged spring and stop parts 80 and 79 and the operation of the torque means 68 under the respective output of the electrolytic levels 81 and 69. When the levelling operation is completed, the pointer of the indicator 77 on the panel 64 reads null. The biasing input circuit to the servomotor 29 is then opened by the human operator by turning the levelling knob 92 to the "normal" position. The levelling circuit including the reference 69 and torque means 68 remains effective in the "normal" operation of the compass. The reference level 69 in this circuit utilizes a low viscosity electrolyte so that in the start-up levelling operation it functions to prevent the gimbal 26 from swinging about axis X—X beyond a level condition. The improved compass is then conditioned for normal operation with the directive member 19 correctly oriented and levelled. When so conditioned the follow-up circuit to servomotor 29 is closed, the levelling circuit to the torque means 68 is closed, the biasing input circuit to the amplifier 36 is open, the caging circuit is open, and the orienting input circuit to the amplifier 36 is open. In the foregoing specification, a plurality of axes have been referred to in connection with the gyrocompass of the present invention and, it is to be understood that these axes are considered to be the mounting axes for the various elements of the compass. Thus, axis W—W constitutes the mounting axis for the pendulous yoke 27 on the main suspension ring 15. The axis X—X is the mounting axis for the vertical gimbal 26 in the pendulous yoke 27; the axis Y—Y is the mounting axis for the sensitive element or rotor bearing member 19 of the gyrocompass in the vertical ring 26. The axis Z—Z is the mounting axis for the main suspension ring 15 within the binnacle 10. The axis K—K constitutes the mounting axis for the rotor 26 in the rotor bearing member 19, i.e., the rotor spin axis.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyroscopic compass of the character including a member having a rotor spinning about a North-South directed axis in a normally horizontal plane, a gimbal on which the member is mounted with freedom about a first normally vertical axis, a pendulous yoke on which the gimbal is mounted with freedom about a normally horizontal axis, a ring on which the yoke is mounted with freedom about a second normally horizontal axis perpendicular to the gimbal axis, a frame on which the ring is mounted to move about a second normally vertical axis, an electrical circuit including a pick-off having a part on the gimbal and a part on the member and a servomotor connected to move the ring about its axis in follow-up relation to the member normally operated by the output of the pick-off; means for orienting and levelling said member under start-up conditions including means for caging the member and gimbal to the yoke, means for operating the caging means including a circuit with a normally open switch, means for providing an orienting input to the servomotor including a circuit having a normally open switch, a normally closed switch in the follow-up circuit, means for conditioning the switches to close the caging and orienting circuits and open the follow-up circuit simultaneously, and means operable upon restoration of the switch conditioning means to normal operation for exerting a torque about the axis of the member depending on its tilt about the gimbal axis to level the oriented member with respect to the gimbal axis.

2. A gyroscopic compass as claimed in claim 1, in which said orienting circuit includes a switch with a manually operable part movable between positions that alternately effect clockwise or counterclockwise movement of the ring and caged member to an oriented condition.

3. A gyroscopic compass as claimed in claim 1, in which the levelling torque exerting means includes a gravity reference device with an electrical output depending on the tilt of the member about the axis of the gimbal, means operable to exert a torque about the axis of the member, and a circuit connecting the device to the torque means.

4. A gyroscopic compass as claimed in claim 1, in which the levelling torque exerting means includes normally angularly displaced spring and stop parts on the member and gimbal arranged in engageable relation to exert a levelling torque about the axis of the member, and means for biasing the follow-up circuit to engage the spring and stop parts including a gravity reference device having an output in accordance with the tilt of the gimbal about its axis.

5. A gyroscopic compass as claimed in claim 1, in which the levelling torque exerting means includes normally angular displaced spring and stop parts on the member and gimbal arranged in engageable relation to exert a levelling torque about the axis of the member, further means for exerting a torque about the axis of the member, a first gravity reference device for detecting tilt about the axis of the gimbal, a circuit connecting the device to said further torquing means, and means for biasing the follow-up circuit to engage the spring and stop parts including a second circuit having a second gravity reference device for detecting tilt about the axis of the gimbal.

6. A combination for orienting and levelling the directive member of a gyroscopic compass during start-up conditions in which the compass includes a ring mounted to move about a vertical axis, a circuit connecting the member to the ring in follow-up relation having a servomotor connected to move the ring, a pendulous yoke mounted on the ring with freedom about a normally horizontal axis, a gimbal mounted on the yoke with freedom about a normally horizontal axis perpendicular to the axis of the yoke on which the member is mounted with freedom about a normally vertical axis; means including a normally open circuit for caging the member and gimbal to the yoke, means including a normally open circuit for providing an orienting input to the servomotor, normally ineffective means for opening the follow-up circuit, means for simultaneously conditioning the caging and orienting circuits for operation and for rendering the follow-up circuit opening means effective, and means operable upon restoration of the caging, orienting and follow-up circuits to normal condition to level the oriented member with respect to the gimbal axis.

7. A combination as claimed in claim 6, in which the orienting circuit includes a switch for reversing the input to the servomotor to control the direction of the movement of the ring and caged member.

8. A combination as claimed in claim 6, in which the levelling means includes a circuit with an electrolytic level mounted on the gimbal to provide an output in accordance with the tilt of the member about the gimbal axis, and a means for exerting a torque about the axis of the member responsive to the output of the level.

9. A combination as claimed in claim 8, in which the levelling means includes normally angularly displaced spring and stop parts on the member and gimbal arranged in engageable relation to exert a levelling torque about the axis of the member, a second electrolytic level providing an output depending on the tilt of the member about the gimbal axis, and the follow-up circuit responsive to the output of the device effects displacement of the parts to an engaged condition.

10. A combination as claimed in claim 6, in which the levelling means includes an electrolytic level providing an output depending on the tilt of the member about the gimbal axis, and a circuit connecting the level to the follow-up circuit.

11. A combination for orienting and levelling the directive member of a gyroscopic compass during start up conditions in which the compass includes a ring mounted to move about a vertical axis, a servomotor connected to move the ring, a pendulous yoke connected to the ring with freedom about a horizontal axis, and a gimbal connected to the yoke with freedom about a horizontal axis on which the member is mounted with freedom about a vertical axis, normally ineffective means for caging the member and gimbal to the yoke, normally ineffective means for orienting the caged member and gimbal, means for conditioning the compass with the caging and orienting means effective, and means operable upon restoration of the caging and orienting means to normal condition for levelling the oriented member about the axis of the gimbal.

12. In a combination for orienting the directive member of a gyroscopic compass during start-up conditions in which the compass includes a ring mounted to move about a vertical axis, a servomotor connected to move the ring, a pendulous yoke connected to the ring with freedom about a horizontal axis, a gimbal mounted on the yoke with freedom about a normally horizontal axis on which the member is mounted with freedom about a normally vertical axis, means for caging the member and gimbal to the yoke, and a circuit for orienting the caged member and gimbal including the servomotor.

13. In a combination for levelling the directive member of a gyroscopic compass during start-up conditions in which the compass includes a ring mounted to move about a vertical axis and a follow-up circuit biasing a servomotor connected to move the ring, and the member is connected to the ring through a gimbal mounted on the ring with freedom about a normally horizontal axis on which the member is mounted with freedom about a normally vertical axis, normally angularly displaced spring and stop parts on the member and gimbal arranged in engageable relation to exert a levelling torque about the axis of the member, and a circuit providing a biasing input to the follow-up circuit to cause engagement between the spring and stop parts.

14. A combination of the character claimed in claim 13, in which the biasing input circuit includes a gravity reference device whose output depends on the tilt of the member about the gimbal axis.

References Cited by the Examiner
UNITED STATES PATENTS

| | | | |
|---|---|---|---|
| 2,786,356 | 3/1957 | Klose | 74—5.1 |
| 2,887,784 | 5/1959 | Carter | 33—226 |
| 3,212,196 | 10/1965 | Carter | 33—226 |

ROBERT B. HULL, *Primary Examiner.*